(12) United States Patent
Zhu

(10) Patent No.: US 12,641,333 B2
(45) Date of Patent: May 26, 2026

(54) SCREENSHOT PROCESSING METHOD, ELECTRONIC DEVICE, AND COMPUTER READABLE MEDIUM

(71) Applicant: GUANGDONG OPPO MOBILE TELECOMMUNICATIONS CORP., LTD., Dongguan (CN)

(72) Inventor: Haizhou Zhu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 12 days.

(21) Appl. No.: 18/913,558

(22) Filed: Oct. 11, 2024

(65) Prior Publication Data

US 2025/0039537 A1 Jan. 30, 2025

Related U.S. Application Data

(63) Continuation of application No. PCT/CN2022/138591, filed on Dec. 13, 2022.

(30) Foreign Application Priority Data

Apr. 15, 2022 (CN) .......................... 202210397260.1

(51) Int. Cl.
*H04N 23/63* (2023.01)
*G06V 10/26* (2022.01)
(Continued)

(52) U.S. Cl.
CPC ........... *H04N 23/632* (2023.01); *G06V 10/26* (2022.01); *G06V 10/443* (2022.01);
(Continued)

(58) Field of Classification Search
CPC .... H04N 23/632; H04N 23/61; H04N 23/667; G06V 10/443; G06V 10/761; G06V 30/18019; G06V 10/26; G06V 30/1448
(Continued)

(56) References Cited

U.S. PATENT DOCUMENTS

2020/0106984 A1 4/2020 Fu et al.

FOREIGN PATENT DOCUMENTS

| | | |
|---|---|---|
| CN | 103870183 A | 6/2014 |
| CN | 107678644 A | 2/2018 |

(Continued)

OTHER PUBLICATIONS

Chinese First Office Action and search report from the Chinese patent Application No. 202210397260.1, mailed Apr. 12, 2024 (15 pages).

(Continued)

*Primary Examiner* — Joel W Fosselman
(74) *Attorney, Agent, or Firm* — Ladas & Parry, LLP

(57) ABSTRACT

A screenshot processing method, relating to the technical field of image processing. The method includes: performing contour recognition on the current picture so as to determine, according to the obtained contour recognition result, a candidate capturing area (S210); in response to an instruction of a screenshot operation, determining at least one target capturing area in the current picture according to the instruction of the screenshot operation and the candidate capturing area (S220); and performing the screenshot operation on the current picture on the basis of the at least one target capturing area so as to generate a target image (S230).

19 Claims, 10 Drawing Sheets

(51) Int. Cl.

| | |
|---|---|
| *G06V 10/44* | (2022.01) |
| *G06V 10/74* | (2022.01) |
| *G06V 30/14* | (2022.01) |
| *G06V 30/18* | (2022.01) |
| *H04N 23/61* | (2023.01) |
| *H04N 23/667* | (2023.01) |

(52) U.S. Cl.
CPC ........ *G06V 10/761* (2022.01); *G06V 30/1448* (2022.01); *G06V 30/18019* (2022.01); *H04N 23/61* (2023.01); *H04N 23/667* (2023.01)

(58) Field of Classification Search
USPC ...................................................... 348/222.1
See application file for complete search history.

(56) References Cited

FOREIGN PATENT DOCUMENTS

| | | | |
|---|---|---|---|
| CN | 107766108 | A | 3/2018 |
| CN | 108733281 | A | 11/2018 |
| CN | 109032466 | A | 12/2018 |
| CN | 109508216 | A | 3/2019 |
| CN | 113672453 | A | 11/2021 |
| CN | 114253451 | A | 3/2022 |
| CN | 114285961 | A | 4/2022 |
| CN | 114708443 | A | 7/2022 |
| WO | 2013021878 | A1 | 2/2013 |
| WO | 2017166959 | A1 | 10/2017 |
| WO | 2023197648 | A1 | 10/2023 |

OTHER PUBLICATIONS

Chinese Second Office Action and search report from the Chinese patent Application No. 202210397260.1, mailed Aug. 2, 2024 (19 pages).

International Search Report in International Application No. PCT/CN2022/138591, mailed on Mar. 7, 2023, with English translation provided by WIPO.

Written Opinion of the International Searching Authority in International Application No. PCT/CN2022/138591, mailed on Mar. 7, 2023, with English translation provided by WIPO.

CNKI China Excellent Master's Thesis Full Text Database (Information Technology Collection), Issue 5; May 15, 2018; Shu Zhan, Research and application of screenshot image functional area segmentation and text information recognition methods; 1138-469; 1-14; Publication dated May 15, 2018.

Chinese Notification to Grant Patent Right for Invention in the corresponding Chinese Patent Application No. 202210397260.1, mailed Oct. 18, 2024 (5 pages).

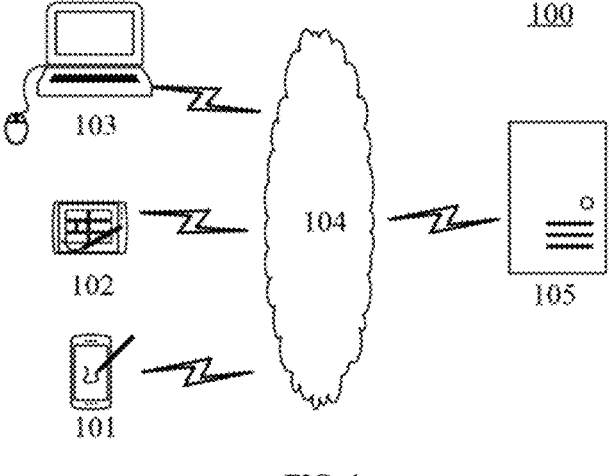

FIG. 1

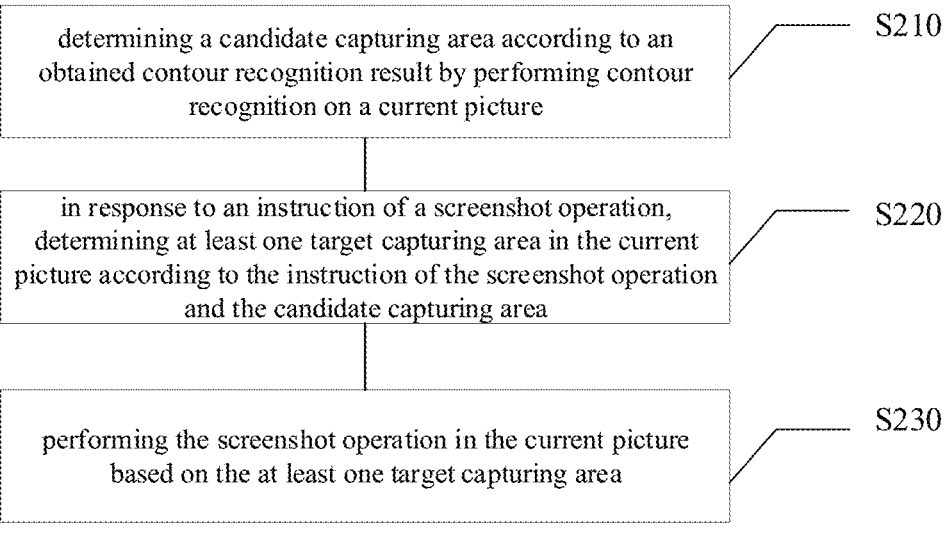

determining a candidate capturing area according to an obtained contour recognition result by performing contour recognition on a current picture — S210 in response to an instruction of a screenshot operation, determining at least one target capturing area in the current picture according to the instruction of the screenshot operation and the candidate capturing area — S220 performing the screenshot operation in the current picture based on the at least one target capturing area — S230

FIG. 2 dividing the candidate capturing areas into at least two
capturing modes corresponding to different image categories
— S810 providing a candidate capture area corresponding to the target
capturing mode in the current picture in response to the user
selecting the target capturing mode from the at least two
capturing modes
— S820

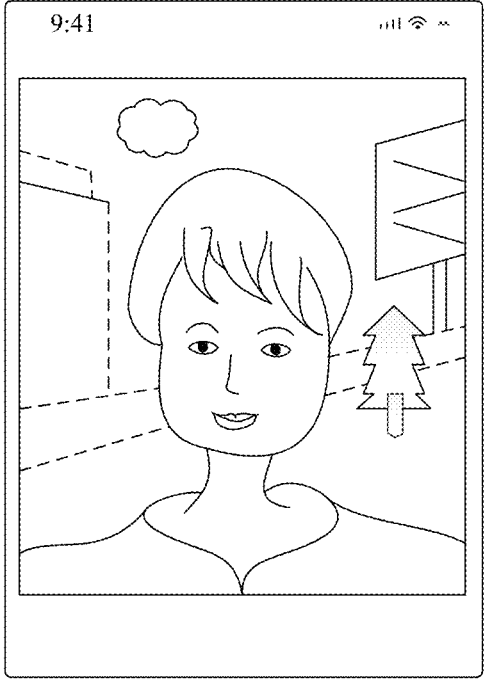

| determining whether an operation duration corresponding to the instruction of the screenshot operation is less than a duration threshold | — S1110 |

| determining at least one target capturing area in the candidate capturing area according to the instruction of the screenshot operation and the candidate capturing area when the operation duration is less than the duration threshold | — S1120 |

FIG. 11

SCREENSHOT PROCESSING METHOD, ELECTRONIC DEVICE, AND COMPUTER READABLE MEDIUM

CROSS-REFERENCE TO RELATED APPLICATIONS

The present application is a continuation-application of International Patent Application No. PCT/CN2022/138591, filed on Dec. 13, 2022, which claims priority of Chinese Patent Application No. 202210397260.1, filed on Apr. 15, 2022, the entire contents of which are hereby incorporated by reference in their entireties.

TECHNICAL FIELD

The present disclosure relates to the technical field of image processing, in particular to a screenshot processing method, an electronic device and a computer-readable medium.

BACKGROUND

Terminal devices can usually implement a variety of functions to meet needs of users. When using the terminal devices, users often need to save content of interest in the terminal devices, such as saving images or text by taking screenshots. However, in the related art, screen content is captured according to the user's instructions of screenshot operations, not only does it require many operating steps, but it also cannot quickly obtain an image that meets the user's expectations, and is very inconvenient in practical applications.

SUMMARY

According to a first aspect of the present disclosure, a screenshot processing method is provided, including: determining a candidate capturing area according to an obtained contour recognition result by performing contour recognition on a current picture; determining at least one target capturing area in the current picture according to an instruction of a screenshot operation and the candidate capturing area, in response to the instruction of the screenshot operation; performing the screenshot operation in the current picture based on the at least one target capturing area.

According to a second aspect of the present disclosure, an electronic device is provided, including: a processor; and a memory for storing one or more executable instructions, by executing the executable instructions, the processor is configured to determine a candidate capturing area according to an obtained contour recognition result by performing contour recognition on a current picture; in response to an instruction of a screenshot operation, determine at least one target capturing area in the current picture according to the instruction of the screenshot operation and the candidate capturing area; and perform the screenshot operation in the current picture based on the at least one target capturing area.

According to a third aspect of the present disclosure, a computer-readable medium is provided, a computer program is stored on the computer-readable medium, and the computer program implements the screenshot processing method when executed by a processor, the screenshot processing method includes: determining a candidate capturing area according to an obtained contour recognition result by performing contour recognition on a current picture; determining at least one target capturing area in the current picture according to an instruction of a screenshot operation and the candidate capturing area, in response to the instruction of the screenshot operation; performing the screenshot operation in the current picture based on the at least one target capturing area.

BRIEF DESCRIPTION OF THE DRAWINGS

FIG. 1 shows a schematic diagram of an exemplary system architecture to which embodiments of the present disclosure may be applied.

FIG. 2 schematically shows a schematic flow diagram of a screenshot processing method provided by some exemplary embodiments of the present disclosure.

FIG. 10 schematically shows a schematic diagram of a result of screening the candidate capturing area in some exemplary embodiments of the present disclosure.

FIG. 11 schematically shows a flow diagram of an implementation for determining a target capturing area in some exemplary embodiments of the present disclosure.

DETAILED DESCRIPTION

Figure 3:
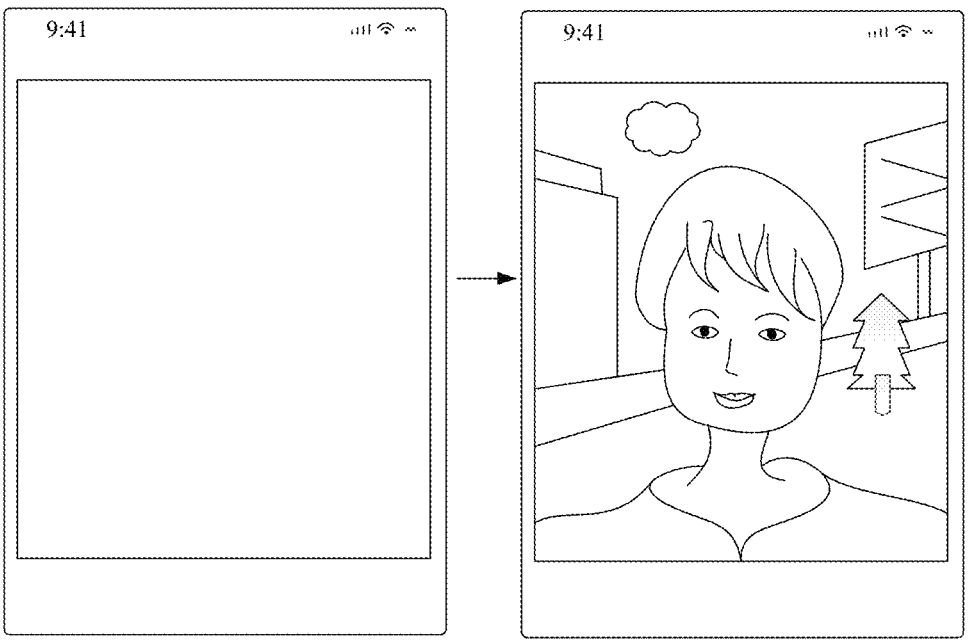
FIG. 3 schematically shows a schematic diagram of a current picture display way provided by some exemplary embodiments of the present disclosure.

Exemplary embodiments will now be described more fully with reference to the accompanying drawings. The exemplary embodiments may, however, be implemented in various forms and should not be construed as limited to the examples set forth herein; rather, these embodiments are provided so that the present disclosure will be thorough and complete, and will fully convey the concepts of the exemplary embodiments to those skilled in the art. The described features, structures or characteristics may be combined in any suitable ways in one or more embodiments.

Furthermore, the accompanying drawings are merely schematic illustrations of the present disclosure and are not necessarily drawn to scale. The same reference in the drawings represent the same or similar parts, and thus their repeated description will be omitted. Some of the block diagrams shown in the drawings are functional entities and do not necessarily correspond to physically or logically separate entities. These functional entities may be implemented in software form, or implemented in one or more hardware modules or integrated circuits, or implemented in different networks and/or processor devices and/or microcontroller devices.

FIG. 1 shows a schematic diagram of a system architecture of an exemplary application environment in which a screenshot processing method and device provided by some embodiments of the present disclosure may be applied. In the following description, "user terminal", "mobile terminal" and "terminal" are used interchangeably.

As shown in FIG. 1, the system architecture 100 may include a network 104, a server 105 and one or more of a terminal device 101, a terminal device 102, and a terminal device 103. The network 104 is a medium used to provide communication links between the terminal device 101, the terminal device 102, the terminal device 103 and the server 105. The network 104 may include various connection types, such as wired, wireless communication links, or fiber optic cables, etc. The terminal device 101, the terminal device 102, and the terminal device 103 may be various electronic devices with image processing function, including but not limited to desktop computers, portable computers, smart phones, and tablet computers, etc. It should be understood that the number of the terminal devices, the networks and the servers in FIG. 1 is only schematic. Depending on implementation needs, there can be any number of terminal devices, networks, and servers. For example, the server 105 may be a server cluster including multiple servers.

The screenshot processing method provided by some embodiments of the present disclosure is generally executed by the terminal device 101, the terminal device 102, or the terminal device 103, correspondingly, the screenshot processing apparatus is generally provided in the terminal device 101, the terminal device 102, and the terminal device 103. However, those skilled in the art can easily understand that the screenshot processing method provided in some embodiments of the present disclosure can also be executed by the server 105, correspondingly, the screenshot processing apparatus may also be provided in the server 105, no special restrictions is made to this in the exemplary embodiments. For example, in an exemplary embodiment, users can collect a current picture through an image collector for collecting pictures provided in the terminal device 101, the terminal device 102, or the terminal device 103, and then upload the current picture to the server 105, and the server 105 performs contour recognition on the current picture using the screenshot processing method provided by the embodiments of the present disclosure, determines a candidate capturing area based on an obtained contour recognition result, and provides the candidate capturing area to the terminal device 101, the terminal device 102, and the terminal device 103. Then, in response to an instruction of a screenshot operation, at least one target capturing area is determined based on the candidate capturing area and the instruction of the screenshot operation to perform a screenshot operation on the current picture according to the at least one target capturing area and capture a target image from the current picture, and send the target image to the terminal device 101, the terminal device 102, and the terminal device 103, etc.

In related technologies, when the users enter a screenshot mode, the users first trigger the instruction of the screenshot operation, then take a screenshot of the picture according to the instruction of the screenshot operation. For example, the users use a touch medium (such as a stylus, users' fingers, mouses, etc.) to manually select a screenshot area on an interface of a mobile terminal, or use a screenshot selection tool (such as a box, a round frame, or a frame in a free shape) provided by systems to select screenshot content. However, this screenshot method completely relies on user operations. The users manually select the screenshot area using the screenshot selection tool, obtained screenshot results are greatly deviated from the users' expectations. For example, the users cannot accurately select contours of a person or an object in the image through manually selecting, and results in unsatisfactory screenshot results, and the users need to make repeated adjustments, which increases the complexity of the screenshot operation and affects the efficiency of the screenshot operation. Meanwhile, the screenshot method in the related technologies have no implementation schemes to pre-judge the users' screenshot intention and provide an executable screenshot way based on a pre-judgement result yet.

Based on one or more of the above problems, a screenshot processing method is provided by the present exemplary embodiment. The screenshot processing method may be applied to the above-mentioned server 105, and may also be applied to one or more of the above-mentioned terminal device 101, terminal device 102, and terminal device 103, which is not particularly limited in the present exemplary embodiment. As shown in FIG. 2, the screenshot processing method may include the following operations S210 to S230:

At operation S210, determining a candidate capturing area according to an obtained contour recognition result by performing contour recognition on a current picture.

In some exemplary embodiments of the present disclosure, before performing the screenshot operation, display content of the terminal interface is regarded as the current picture. For example, when the user terminal enters the screenshot mode, and the display content of the terminal interface is static content such as pictures, web pages, or text, etc., then the display content of the current terminal interface is regarded as the current picture; when the user terminal enters the screenshot mode, and the display content of the terminal interface is dynamic content such as animations or movies being played, etc., a single frame of picture corresponding to when entering the screenshot mode is regarded as the current picture.

Figure 4:
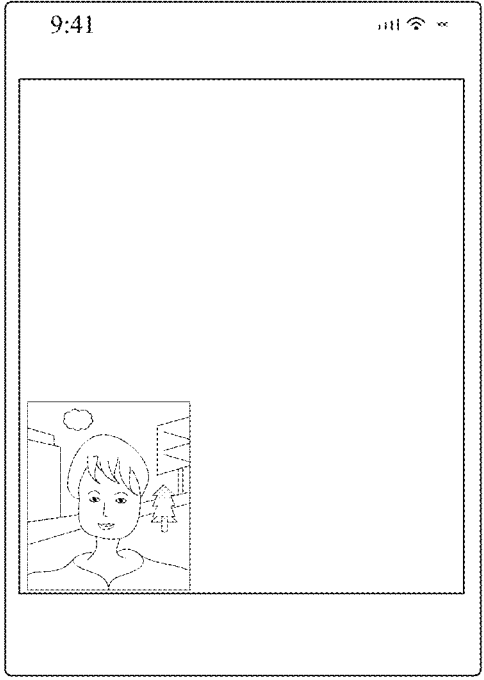
FIG. 4 schematically shows a schematic diagram of another current picture display way provided by some exemplary embodiments of the present disclosure.

As shown in FIG. 3, the current picture may completely cover a display area of the terminal interface, that is, after the user terminal enters the screenshot mode, the terminal interface only displays the current picture. The current picture may also partially cover the display area of the terminal interface, as shown in FIG. 4, the current picture may be displayed on an end of the terminal interface, or be displayed on a certain foldable screen of a foldable phone, while another foldable screen normally displays other display content of the terminal interface, the users can choose whether to completely cover the current picture on the terminal interface. Of course, the embodiments of the present disclosure include but are not limited to the above-mentioned display ways of the current picture, the display ways of the current picture can be adjusted accordingly according to actual application scenarios of screenshot processing.

Ways of entering the screenshot mode in the embodiments of the present disclosure includes but are not limited to: clicking a screenshot key or a combination of keys on the terminal, or triggering a physical button on the stylus, etc., the embodiments of the present disclosure does not make limitations on this.

Image recognition refers to the technology of identifying various targets and objects using computers to process, analyze and understand images, which is a practical application of deep learning algorithms. For example, biometric recognition, object and scene recognition, video recognition, etc., involving image matching, image classification, image retrieval, face detection, edge contour detection, etc. Contour recognition of the current picture through the image recognition technology may include: obtaining basic information of the current picture, converting the basic information of the current picture into information that can be recognized by machines, and then performing image preprocessing, feature extraction and selection, and classifier decision-making, etc., to recognize person, objects, text or scenes in the current screen. Image preprocessing includes but is not limited to image enhancement, image restoration, morphological processing, color image processing and other processes. The embodiments of the present disclosure may perform contour recognition on the current picture based on at least one of the above image recognition methods. Any technical means that can be used for contour recognition on the current picture can be used as the recognition method in the embodiments of the present disclosure.

Figure 5:
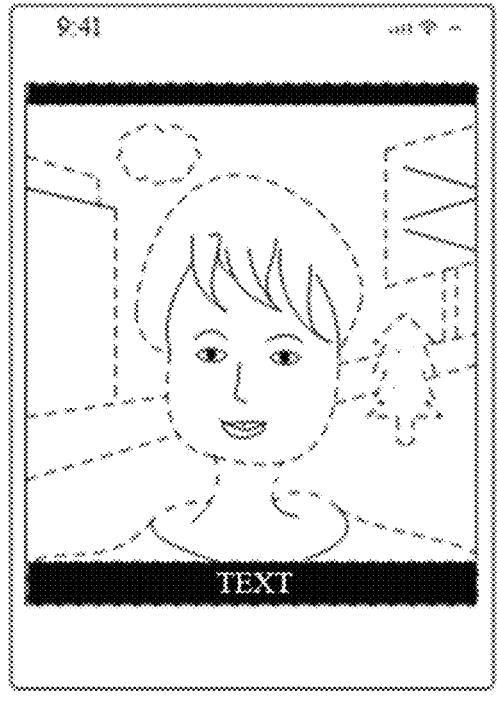
FIG. 5 schematically shows a schematic diagram of determining a candidate capturing area based on a contour recognition result of the current picture in some exemplary embodiments of the present disclosure.

FIG. 5 shows a schematic diagram of determining a candidate capturing area according to the contour recognition result of the current picture in some embodiments of the present disclosure. As shown in FIG. 5, the current picture is a frame of a movie video. After recognizing contour of the current picture, the determined candidate capturing areas include upper and lower black edges, bottom text, characters, background billboards, trees, tall buildings, clouds and highways, etc. The contour of the determined candidate capturing area may be displayed differently, such as changing the contour's colors, line shape, etc., to provide the user with a more intuitive visual prompt.

In some embodiments, image content of each candidate capturing area may also be determined based on the contour recognition result, and the image category of the candidate capturing area may be determined based on the category of the image content. For example, determining the image category of the candidate capturing area as text, determining the image category of the candidate capturing area as characters, determining the image category of the candidate capturing area as items, determining the image category of the candidate capturing area as landscape, determining the image category of the candidate capturing area as webpages, etc. Based on this, the contours of the candidate capturing areas or the entire of the candidate capturing areas belonging to different image categories may also be displayed differently. For example, the contours of characters and the contours of background billboards can be displayed differently, the contours of the clouds and the trees on the background (both belonging to the landscape category) are displayed in the same way. The embodiments of the present disclosure can differentially display the contours of the candidate capturing areas according to the actual screenshot.

After determining the candidate capturing areas and displaying the candidate capturing areas differently, the user can intuitively obtain areas in the current picture where the screenshot operation can be performed. This process is a prejudgment of the user's intention to take screenshots. By providing the candidate capturing areas for the users for reference, not only it enriches the ways of screenshot on the current picture, but also reduces the complexity of subsequent screenshot operations based on the candidate capturing areas to improve efficiency of the screenshot operations, lower operation difficulty for the screenshot operations, and make it easier for users of different ages to obtain screenshot results that meet their needs.

At operation S220, in response to an instruction of a screenshot operation, determining at least one target capturing area in the current picture according to the instruction of the screenshot operation and a candidate capturing area.

In some exemplary embodiments of the present disclosure, the instruction of the screenshot operation is detected. The instruction of the screenshot operation may be the user's operation on the user terminal through a touch medium (such as a user's finger, a stylus, etc.), objects of the detection include but are not limited to operation information such as operation tracks, operation duration, pressure, etc. At least one target screenshot area is determined in the current picture according to the instruction of the screenshot operation and the candidate capturing area.

The target capturing area may be at least one of the candidate capturing areas. The target capturing area may also be an area in the current picture that is different from the candidate capturing areas. The target capturing area may include both the at least one of the candidate capturing areas and the area that is different from the candidate capturing areas. That is, based on the instruction of the screenshot operation and the candidate capturing areas, the user can select at least one of the candidate capturing areas as the target capturing area, or skip the candidate capturing areas, subject to the target capturing area determined by the instruction of the screenshot operation, or select at least one of the candidate capturing areas as the target capturing area while the area determined by the instruction of the screenshot operation is selected as the target capturing area.

In the exemplary embodiments, the target capturing area is determined according to the candidate capturing area in combination with the instruction of the screenshot operation, the finally obtained target capturing area is obtained according to the user's screenshot intention, the screenshot results that meet the user's expectations is easier to obtain, and the accuracy of the screenshot operation is improved.

At operation S230, performing the screenshot operation on the current picture based on the at least one target capturing area.

In some exemplary embodiments of the present disclosure, after the at least one target capturing area is obtained, the screenshot operation is performed on the current picture according to the at least one target capturing area to capture the target image on the current picture. The user terminal can perform the screenshot operation on the current picture according to the at least one target capturing area to obtain the target image, or the server can perform the screenshot operation on the current picture according to the at least one target capturing area to obtain the target image, then return the target image to the user terminal to display, and this is not limited in the present disclosure.

Figure 6:
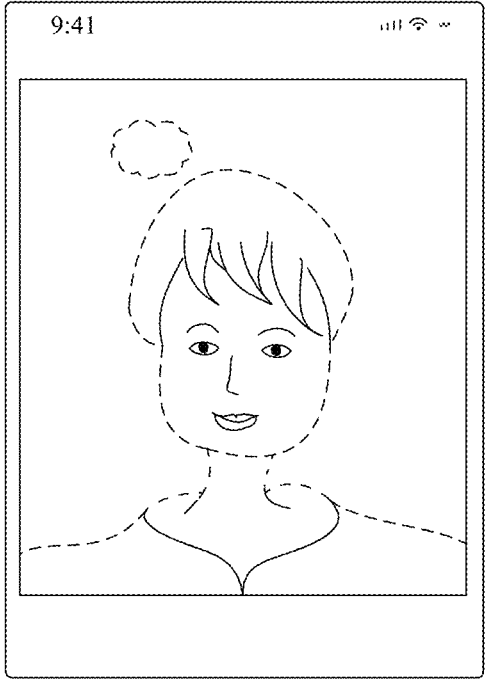
FIG. 6 schematically shows a schematic diagram of a generated target image in some exemplary embodiments of the present disclosure.

In some embodiments, the screenshot operation is performed on the current picture based on the at least one target capturing area, and the target image is generated based on the at least one obtained screenshot. That is, as shown in FIG. 5, when the characters and the clouds are determined as the target capturing area, then the generated target image is shown in FIG. 6 after taking a screenshot of the current picture.

Figure 7:
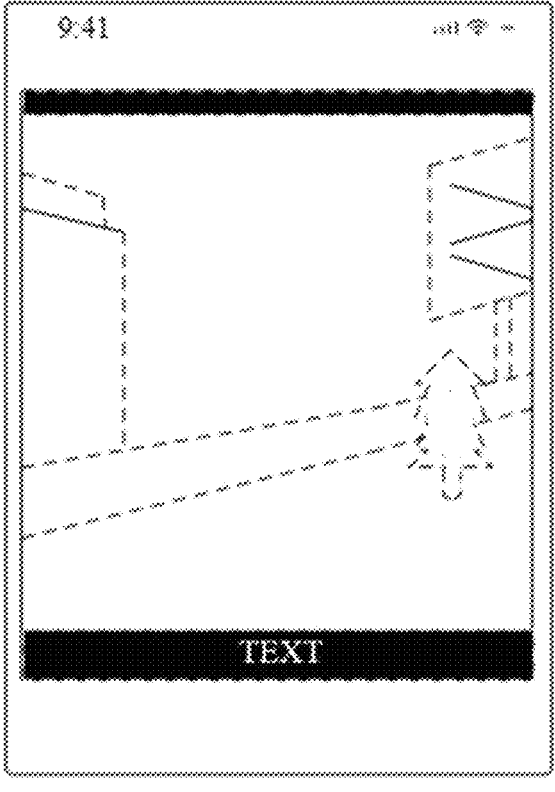
FIG. 7 schematically shows a schematic diagram of another generated target image in some exemplary embodiments of the present disclosure.
Figure 8:
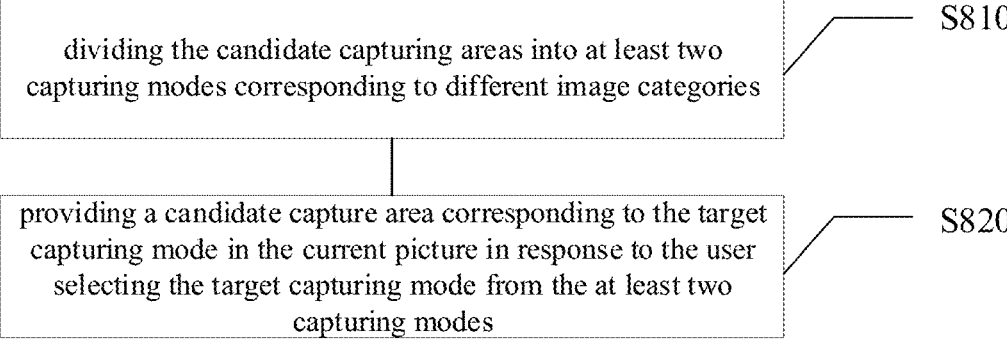
FIG. 8 schematically shows a flow diagram for screening the candidate capturing area in some exemplary embodiments of the present disclosure.

Correspondingly, in some other embodiments, the screenshot operation is performed on the current picture according to the at least one target capturing area, and the at least one obtained screenshot is deleted to generate the target image according to the current picture having the at least one screenshot deleted, as the target image having the characters and clouds deleted shown in FIG. 7. That is, the target capturing area may not be regarded as the target image captured on the current picture, an area other than the target capturing area may be regarded as the target image captured on the current picture. Optionally, the part of the road blocked by the characters in FIG. 5 can be restored, or not. It is chosen whether to restore based on actual scenarios.

According to some exemplary embodiments of the present disclosure, the screenshot is performed on the current picture based on the at least one determined target capturing area, a rigid mode of taking a complete screenshot of the current interface is broken through. Area is selectively captured from the current interface, and the screenshot ways are enriched. Since the target capturing area is determined according to the candidate capturing area in combination with the instruction of the screenshot operation, the target image is more standardized instead of in an irregular screenshot shape, making the target image meets the user's expectation, and raising the screenshot efficiency. For terminal users of different ages, the screenshot results that meet expectations can be captured, and the user experience is good.

In some exemplary embodiments, in order to further improve the screenshot efficiency, an implementation of screening the candidate capturing areas is provided. Before determining at least one target capturing area in the current picture according to an instruction of a screenshot operation and a candidate capturing area in response to the instruction of the screenshot operation, the method further includes operations S810 and S820:

At operation S810, dividing the candidate capturing areas into at least two capturing modes corresponding to different image categories.

In some exemplary embodiments of the present disclosure, the image content of each candidate capturing area may be determined according to an image recognition result, so as to determine the image category of the candidate capturing area according to the category of the image content. For example, the image category may include text, character, item, landscape, webpage, etc. These categories can be further divided. For example, the text may be further divided according to typefaces, character forms, colors of the text, etc., and characters may be further divided to faces, limbs, ornaments, etc. Embodiments of the present disclosure can determine the image category of the candidate capturing area based on the actual screenshot scenario, and divide the candidate capturing area into at least two capturing modes based on the image category of the candidate capturing area.

For example, as shown in FIG. 5, the candidate capturing area can be divided into four capturing modes according to the image category of the candidate capturing area: capturing mode 1 includes characters, capturing mode 2 includes landscapes (clouds and trees), capturing mode 3 includes urban constructions (buildings and highways), and capturing mode 4 includes billboards. Of course, each capturing mode can be further divided, and the embodiments of the present disclosure will not list them one by one here.

In some exemplary embodiments of the present disclosure, after the candidate capturing area is divided into at least two capturing modes, a capturing mode selection option can be provided on the user terminal for the user to select, thereby providing the candidate capturing area corresponds to a target capturing mode on the present picture in response to the user selecting the target capturing mode from the at least two capturing modes.

Figure 9:
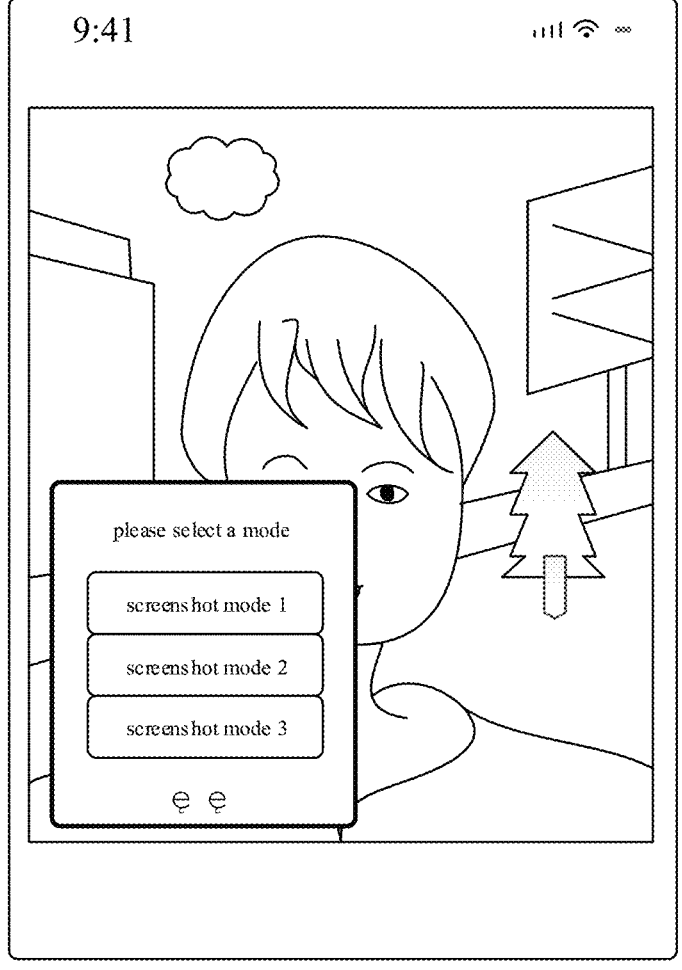
FIG. 9 schematically shows a schematic diagram of a terminal interface after entering a screenshot mode in some exemplary embodiments of the present disclosure.

As shown in FIG. 9, a capturing mode selection option may first be provided in the current interface of the user terminal for the user to select, and then only the candidate capturing area corresponding to the target capturing mode is displayed on the current interface.

At operation S820, providing a candidate capturing area corresponding to the target capturing mode in the current picture in response to the user selecting the target capturing mode from the at least two capturing modes.

In an exemplary embodiment of the present disclosure, in response to the user selecting the target capturing mode from the at least two capturing modes, the candidate capturing area corresponding to the target capturing mode can be provided in the current picture. As shown in FIG. 10, when receiving the user's operation of selecting the target capturing mode "urban constructions" among the at least two capturing modes (as shown in FIG. 9), only the candidate capturing areas which contain "buildings" and "highways" (the contour of which is a dotted line) related to "urban constructions" are provided in the current picture, while the candidate capturing areas of other categories (the contour of which is a solid line) are not displayed.

Of course, some embodiments of the present disclosure may also display another candidate capturing area not selected by the user and the candidate capturing areas corresponding to the target capturing mode in a different way, so as to highlight the candidate capturing area corresponding to the target capturing mode.

In the exemplary embodiments of the present disclosure, by providing the user with capturing mode selection options and providing candidate capturing area corresponding to the target capturing mode in the current picture, interference from other capturing modes on the user's selection can be eliminated. For example, when the present picture has many images of different categories, if all the candidate capturing areas are displayed on the picture, it will easily cause visual confusion for the user, and make it difficult to accurately find the expected candidate capturing area.

In some exemplary embodiments of the present disclosure, an implementation of determining a target capturing area is also provided. Determining at least one target capturing area in the current picture according to an instruction of a screenshot operation and a candidate capturing area in response to the instruction of the screenshot operation may include: determining at least one target capturing area in the candidate capturing area according to an instruction of a first operation and the candidate capturing area in response to the instruction of the first operation. The instruction of the first operation may be the instruction of the screenshot operation in which the operation duration is less than a duration threshold, or the instruction of the screenshot operation in which the pressure is less than a pressure threshold, etc. Embodiments of the present disclosure may determine the first operation based on the actual screenshot scenario.

For example, for a scenario where the instruction of the first operation is the instruction of the screenshot operation in which the pressure is less than the pressure threshold, the determining at least one target capturing area in the candidate capturing area according to an instruction of a first operation and the candidate capturing area in response to the instruction of the first operation may include operations S1110 to S1120:

At operation S1110, determining whether an operation duration corresponding to the instruction of the screenshot operation is less than a duration threshold.

In some exemplary embodiments of the present disclosure, the operation duration corresponding to the instruction of the screenshot operation refers to the entire duration between the time the user uses a touch medium (such as a user's finger, a stylus, a mouse, etc.) to trigger an initial touch point on the user terminal interface and the time the touch medium leaves the user terminal interface. The duration threshold is determined based on actual hardware structure of the user terminal and the actual screenshot scenario, for example, the duration threshold can be 0.1 seconds, 0.2 seconds, etc., the embodiments of the present disclosure do not make limitations to this. Embodiments of the present disclosure may compare the operation duration corresponding to the instruction of the screenshot operation with the duration threshold to determine whether the operation duration corresponding to the instruction of the screenshot operation is less than the duration threshold.

Different comparison results of the operation duration and the duration threshold may correspond to different screenshot intentions, and then different screenshot ways are provided based on the comparison results.

At operation S1120, determining at least one target capturing area in the candidate capturing area according to the instruction of the screenshot operation and the candidate capturing area when the operation duration is less than the duration threshold.

In some exemplary embodiments of the present disclosure, compared with directly selecting existing candidate capturing areas, it usually takes more time when the user selects the screenshot content by himself in the terminal interface. Therefore, if the operation duration is less than the duration threshold, it indicates that the user wants to determine the target capturing area from the existing candidate capturing areas. That is, if the operation duration is less than the duration threshold, at least one target capturing area can be determined from the candidate capturing areas according to the instruction of the screenshot operation and the candidate capturing areas. That is to say, at least one target capturing area can be directly selected from the candidate capturing areas according to the instruction of the screenshot operation.

In the exemplary embodiments of the present disclosure, when the operation duration is less than the duration threshold, it is predicted that the user's operation intention is to select from the existing candidate capturing areas. Therefore, at least one target capturing area can be determined from the candidate capturing areas according to the instruction of the screenshot operation. Determining the user's operation intention according to the comparison result between the operation duration and the duration threshold, provides a screenshot way that meets the user's needs, reduces the user's thinking cost of the screenshot operation, and also improves the efficiency of the screenshot operation.

In some exemplary embodiments of the present disclosure, an implementation for determining the target capturing area in response to the instruction of the first operation is provided. The implementation includes: obtaining coincident track points between the operation track and the candidate capturing area; determining a target candidate capturing area as the target capturing area in response to the target candidate capturing area existing, the proportion of the number of the coincident track points corresponding to the target candidate capturing area to the total number of the operation track points being greater than a proportion threshold.

The operation track may be a sliding track (such as drawing circles, drawing lines, etc.) of the touch medium on the user terminal interface, the track points of a click operation (such as click, double clicks, or triple clicks), etc. The specific type of the operation track is not limited in the present disclosure. The coincident track point between the operation track and the candidate capturing area refers to the track point where the operation track falls within the candidate capturing area, or the point where the operation track and the boundary of the candidate capturing area overlaps. The operation track may have the coincident track point on one candidate capturing area. Alternatively, the operation track may have the coincident track points on multiple candidate capturing areas. Based on this, the embodiments of the present disclosure determine the target candidate capturing area whose proportion of the number of the coincident track points to the total number of operation track points is greater than the proportion threshold as the target capturing area.

Figure 12:
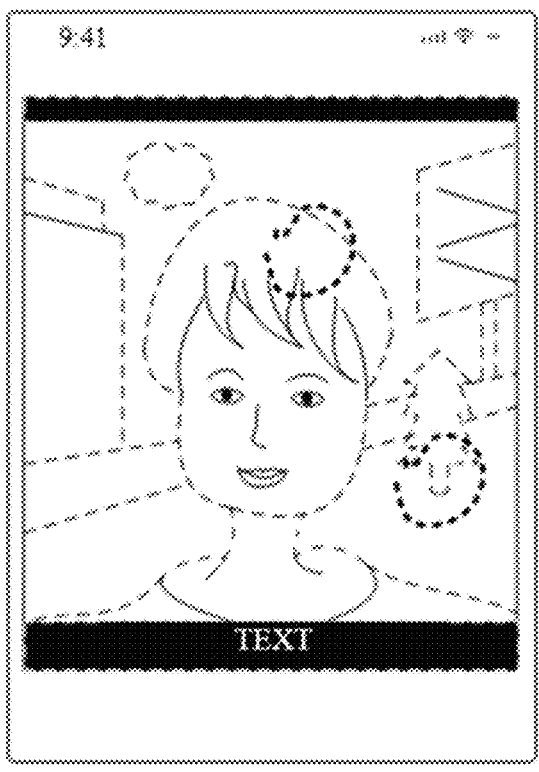
FIG. 12 schematically shows a schematic diagram of determining the target capturing area in the candidate capturing area based on an instruction of a screenshot operation and the candidate capturing area in some exemplary embodiments of the present disclosure.

Exemplarily, FIG. 12 shows a schematic diagram of determining the target capturing area in the candidate capturing area based on an instruction of a screenshot operation and the candidate capturing area in some exemplary embodiments of the present disclosure. The number of the coincident track points between the operation track and the candidate capturing area where the character is located is 17, accounting for 68% of the total 25 operation track points, which is greater than the proportion threshold of 60%. The number of the coincident track points between the operation track and the candidate capturing area where the tree is located is 6, accounting for 24% of the total 25 operation track points, which is less than the proportion threshold 60%. Therefore, the candidate capturing area corresponding to the character is determined as the target capturing area. The bold dots shown in FIG. 12 represent the operation track, and the operation tracks in each of the following figures are represented by the bold dots in the figures, which will not be described again.

In the exemplary embodiments, the target capturing area is determined from the target candidate capturing areas based on the comparison result of the number of the coincident track points between the operation track and the candidate capturing area and the proportion threshold, so that the screenshot area desired by the user can be accurately obtained, and the selection of the wrong screenshot area cause by user's mis-operations (such as the operation track has the coincident track points on multiple candidate capturing areas) is avoided.

It should be noted that in the process of determining the coincident track point between the operation track and the candidate capturing area, the operation track refers to the operation track corresponding to a selection operation, that is, the operation track generated when the time the initial touch point triggered until the time the touch medium leaves the user terminal interface, and if the user needs to select multiple candidate capturing areas, multiple operation tracks are generated, and the coincident track points between the multiple operation tracks and the corresponding candidate capturing areas are obtained respectively, so as to compare the proportion of the number of the coincident track points to the total number of the corresponding operation track points with the proportion threshold to realize the selection operation of the multiple candidate capturing areas. As shown in FIG. 12, the user performs two selection operations respectively, each selection operation has a corresponding operation track, and the above-mentioned judgment process was performed for each operation track, which will not be described again.

In some exemplary embodiments of the present disclosure, in order to improve the efficiency of determining the target capturing area, another implementation of determining the target capturing area in response to the instruction of the first operation is provided, the implementation includes: determining at least two target candidate capturing areas as target capturing areas in response to the operation track having coincident track points coincident with the at least two target candidate capturing areas.

Figure 13:
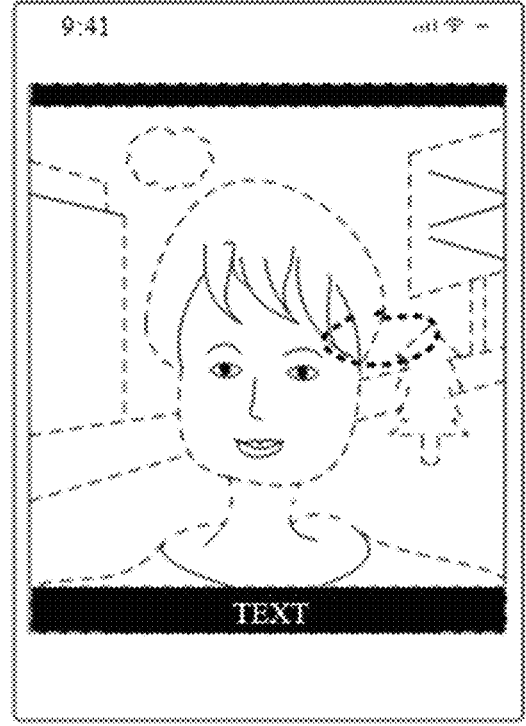
FIG. 13 schematically shows a schematic diagram of simultaneously selecting multiple candidate capturing areas in some exemplary embodiments of the present disclosure.

The operation track may cross multiple candidate capturing areas, so the multiple candidate capturing areas crossed may be determined as the target capturing area. As shown in FIG. 13, according to the exemplary embodiments, the candidate capturing areas where the character and the tree are located may also be determined as the target capturing areas, so as to improve the selection efficiency of the target capturing areas.

It should be noted that there may be a situation where although the operation track has coincident track points coincident with multiple areas, some areas wherein are not candidate capturing areas, then such non-candidate capturing areas will not be determined as the target capturing areas. As shown in FIG. 13, although there are coincident track points between the operation track and white background, the white background area is not the candidate capturing area, so the white background is not determined as the target capturing area.

In some exemplary embodiments, an implementation of completing the target capturing area is also provided, the implementation includes: in response to another candidate capturing area that has no points coincident with the operation track and that are located within the target candidate capturing area existing, then the another candidate capturing area is also determined as the target capturing area, the another candidate capturing area has no points coincident with the operation track.

Figure 14:
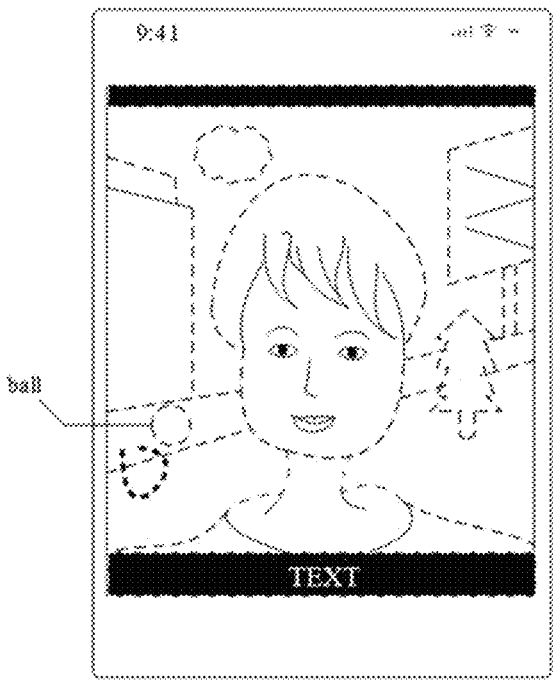
FIG. 14 schematically shows a schematic diagram of an implementation of completing the target capturing area in some exemplary embodiments of the present disclosure.

For example, as shown in FIG. 14, the operation track does not have coincident track points coincident with the "ball" on the target candidate capturing area "highway", but the "ball" is located in the target candidate capturing area "highway", then the "ball" is also determined as the target capturing area. Based on this, the target capturing area can be completed to obtain a complete target capturing area.

On the basis of the foregoing exemplary embodiments, in order to further improve the integrity of the target capturing area, embodiments of the present disclosure provide another implementation of completing the target capturing area, the implementation includes: in response to another candidate capturing area overlapping the target candidate capturing area existing, determining the another candidate capturing area as the target capturing area as well, the another candidate capturing area has no points coincident with the operation track.

Figure 15:
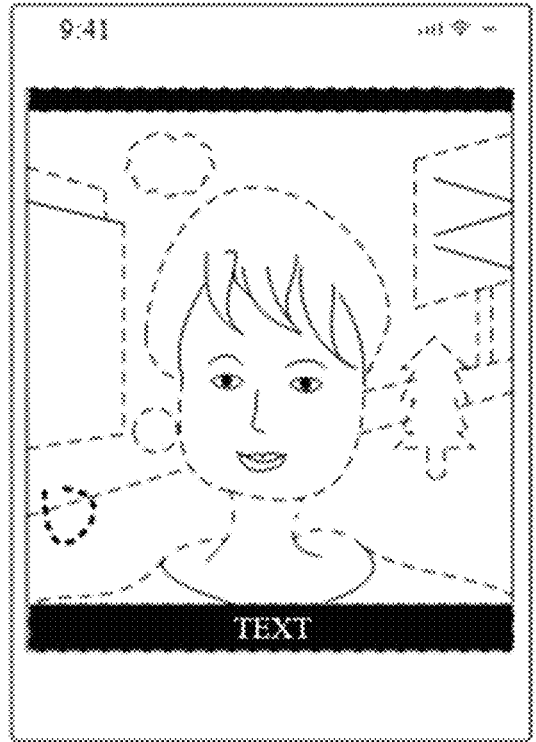
FIG. 15 schematically shows a schematic diagram of another implementation of completing the target capturing area in some exemplary embodiments of the present disclosure.

For example, as shown in FIG. 15, the operation track has no coincident track points coincident with the "ball" on the target candidate capturing area "highway", and the area corresponding to the "ball" overlaps the area corresponding to the "highway", then not only the part (overlapping part) of the ball located within the area corresponding to the "highway" but also the part (the upper half of the ball) of the ball located outside the area corresponding to the "highway" is determined as the target capturing area, that is, the "ball" is also determined as the target capturing area, thereby improving the integrity of the target capturing area and avoiding missing objects or obtaining incomplete objects in the final screenshot.

In some exemplary embodiments of the present disclosure, in order to provide a screenshot way that better suits the user's needs according to the instruction of the screenshot operation, another implementation of determining the target capturing area is provided, the implementation includes: determining at least one target capturing area in the current picture according to a track shape corresponding to the operation track in response to an instruction of a second operation. The instruction of the second operation may be an instruction of a screenshot operation of which the operation duration is greater than or equal to the duration threshold, or an instruction of a screenshot operation of which the corresponding pressure is greater than or equal to the pressure threshold, etc. Embodiments of the present disclosure may determine the instruction of the second operation based on the actual screenshot scenario.

For example, in a scenario where the instruction of the second operation is the instruction of the screenshot operation of which the operation duration is greater than or equal to the duration threshold, determining at least one target capturing area in the current picture according to a track shape corresponding to the operation track in response to an instruction of a second operation may include an operation S1130, and operation S1130 and operation S1120 are not prioritized.

At operation S1130: determining at least one target capturing area in the current picture according to the track shape corresponding to the operation track in response to the operation duration being greater than or equal to the duration threshold.

In the exemplary embodiments of the present disclosure, when the user frames or selects the screenshot content in the terminal interface, it usually takes a certain amount of operation time. Therefore, when the operation duration is greater than or equal to the duration threshold, it indicates that the user does not need to determine the provided candidate capturing area as the target capturing area, and at least one target capturing area can be determined in the current picture according to the track shape corresponding to the operation track. That is, the target capturing area is determined based on the graphic area drawn by the user. When it is determined that the user is drawing the target capturing area manually, the provided candidate capturing area may be hidden to avoid the candidate capturing area from interfering with the user's vision.

In some embodiments, a target similarity between the track shape of the operation track and a preset track shape is obtained. The target capturing area is determined according to the target track shape corresponding to the target similarity in response to the target similarity being greater than or equal to a similarity threshold. A variety of track shapes is preset, such as ellipse, square, heart, diamond, and five-pointed star, etc.

Figure 16:
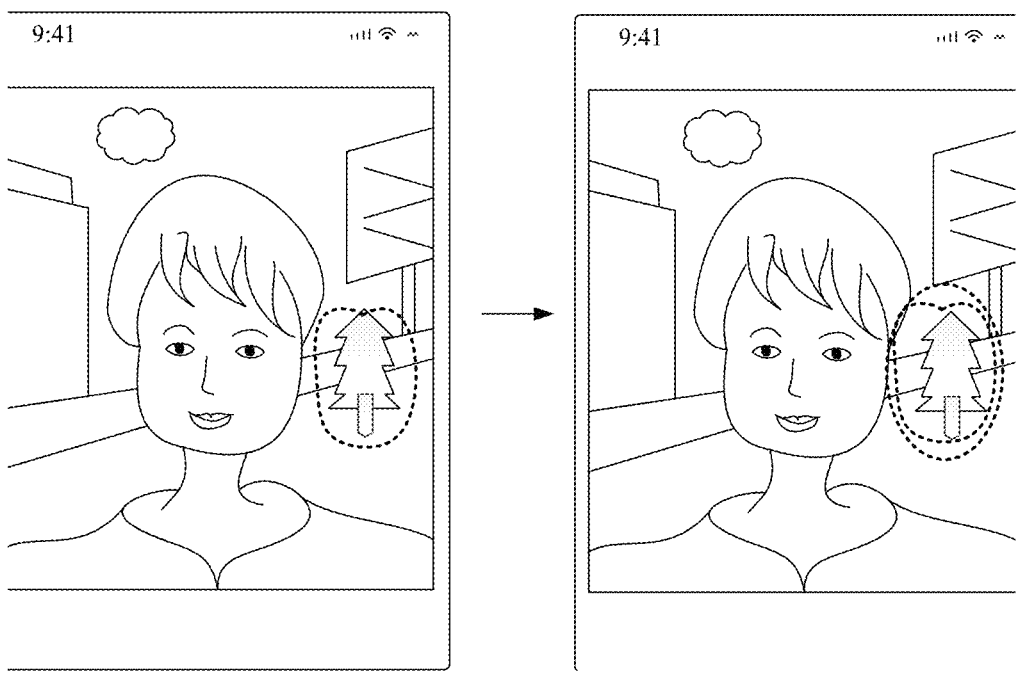
FIG. 16 schematically shows a schematic diagram of determining the target capturing area according to a target track shape corresponding to a target similarity in some exemplary embodiments of the present disclosure.

A target capturing area is generated in the current picture according to target track shape, and the target capturing area contains the operation track. As shown in FIG. 16, when the similarity between the track shape of the operation track and the ellipse is greater than the similarity threshold, an elliptical target capturing area is generated in the current picture according to the elliptical track, and the elliptical target capturing area contains the user's operation track. Based on this, according to the user's operation track, the target capturing area of a certain regular shape that the user needs to draw is predicted, thereby generating the target capturing area of a regular shape containing the operation track. Not only the user's screenshot intention is integrated into a final target capturing area, but also the screenshots in regular shapes is generated more accurately in the target capturing area, giving the user a good user experience and raising product usage. The area of the target capturing shape may be the smallest one of areas containing the track shape of the operation track, or the size of the area of the target capturing shape can be adjusted accordingly according to actual screenshot requirements.

In other exemplary embodiments, the target capturing area is determined according to the track shape of the operation track in response to the similarity between the track shape of the operation track and the track in a preset shape being less than or equal to the similarity threshold.

In addition, in some exemplary embodiments of the present disclosure, the at least one target capturing area may be both selected from the candidate capturing area and determined according to the track shape of the user's operation track, and combining all the obtained target capturing areas to obtain the final target capturing area. Specific determination ways of each target capturing area have been disclosed in the above embodiments and will not be described again here.

In some exemplary embodiments of the present disclosure, image recognition technology is used to scan the current picture to obtain the image content in the current picture, combined with technologies such as automatic edge recognition, color difference recognition, people and object recognition, automatic image matting, etc., to extract the contour of the image content to determine the boundary line of the capturing area based on the contour, and then obtain the candidate capturing area. Various open source algorithms for intelligent analysis of the current picture are applicable to the embodiments of the present disclosure, and will not be described in detail here.

In some embodiments, when determining the boundary of the capturing area based on the contours, the obtained contours can be filtered, for example, the contours with a probability value greater than 70% are determined as the boundary line of the capturing area, and the contours with probability values less than or equal to 70% are not determined as the boundary line of the capturing area, thereby improving the accuracy of determining the candidate capturing area by filtering the contours. The probability value is obtained through the image recognition technology and is used to characterize the possibility of whether the recognition result is a contour.

In some exemplary embodiments of the present disclosure, the image category in the current picture may be text. When recognizing the image of the current picture, the text in different styles may be regarded as different recognition results. That is, if the category of the image content corresponding to the contour is text, the contour can be separated into sub-contours corresponding to different text styles. For example, the contours of text of SimSun, KaiTi, Bold are determined as different sub-contours, and each separated sub-contour is regarded as an independent candidate capturing area. Of course, the contours may also be separated into different sub-contours according to text color, font size, etc., each may be regarded as an independent candidate capturing area, and this will not be described in detail in the embodiments of the present disclosure.

In the exemplary embodiments, after separating the text into different candidate capturing areas according to the text styles, the user can select the candidate capturing area corresponding to a target text style according to the actual capturing requirements. For example, all blue text may be selected and regarded as the candidate capturing area, which will meet different screenshot requirements of the users.

In some exemplary embodiments, when determining the category of the target capturing area being text, the target capturing area may be recognized using OCR (Optical Character Recognition), and an editing function of the recognition results is provided for the user to perform editing operations such as cutting, copying, and saving, etc., to meet the user's intention of selecting text through the screenshots.

To sum up, in the exemplary embodiments of the present disclosure, before the users perform the instruction of the screenshot operation, a candidate capturing area where the screenshot operation can be performed is first provided as a reference for the users to select, so as to quickly determine the screenshot area and perform the screenshot operation, which compared with rigidly cutting off the entire picture, enriches the ways of taking screenshots of the current picture. The complexity of the screenshot operation is reduced, and the efficiency of the screenshot operation is raised; the target capturing area is determined according to the candidate interception area in combination with the user's screenshot operation in the embodiments of the present disclosure, the user's screenshot operation intention is integrated into the determination process of the target capturing area, making it easier to obtain screenshot results that meet the user's expectations.

It should be noted that the above-mentioned figures are only schematic illustrations of processes included in methods according to the exemplary embodiments of the present disclosure, and are not intended to be limiting. It is readily understood that the processes shown in the above figures do not indicate or limit the temporal sequence of these processes. In addition, it is also easy to understand that these processes may be executed synchronously or asynchronously in multiple modules, for example.

Figure 17:
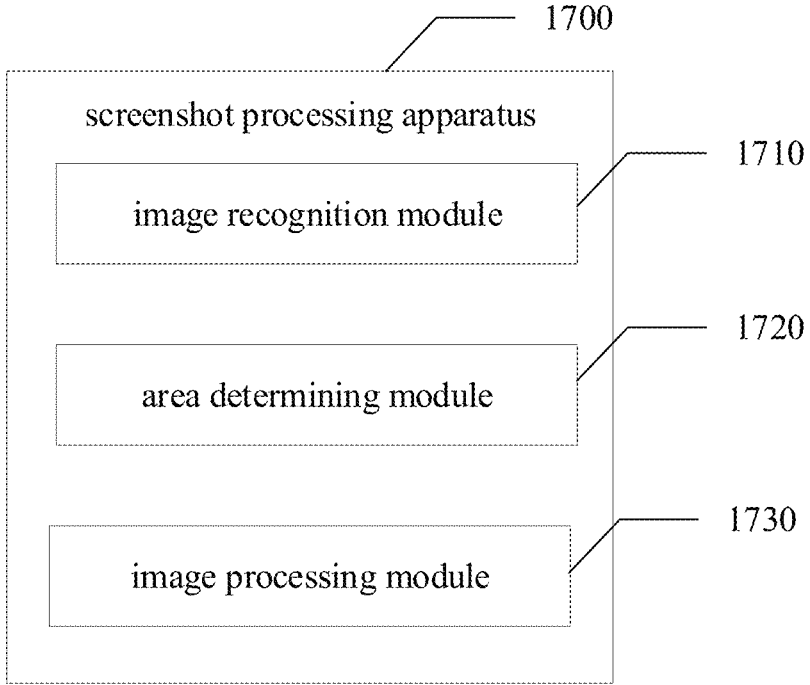
FIG. 17 schematically shows a schematic structural block diagram of a screenshot processing apparatus in some exemplary embodiments of the present disclosure.

In addition, as shown in FIG. 17, a screenshot processing apparatus 1700 is provided in some exemplary embodiments of the present disclosure, the screenshot processing apparatus 1700 includes an image recognition module 1710, an area determining module 1720 and an image processing module 1730.

The image recognition module 1710 may be configured to perform contour recognition on a current picture to determine a candidate capturing area according to an obtained contour recognition result.

The area determining module 1720 may be configured to determine at least one target capturing area in the current picture according to an instruction of a screenshot operation and the candidate capturing area in response to the instruction of the screenshot operation. The image processing module 1730 may be configured to perform the screenshot operation in the current screen based on the at least one target capturing area.

In some exemplary embodiments, the area determining module 1720 may include a first determining unit configured to determine the at least one target capturing area in the candidate capturing area according to the instruction of the first operation and the candidate capturing area in response to an instruction of a first operation.

In some exemplary embodiments, the instruction of the first operation is the instruction of the screenshot operation of which an operation duration is less than a duration threshold.

In some exemplary embodiments, the first determining unit may further include an acquisition subunit which is configured to obtain a coincident track point between an operation track and the candidate capturing area; a first determining subunit configured to determine a target candidate capturing area as the target capturing area in response to the target candidate capturing area existing, wherein a proportion of the number of the coincident track points corresponding to the target candidate capturing area to the total number of operation track points is greater than a proportion threshold.

In some exemplary embodiments, the first determining unit may further include a second determining subunit configured to determine at least two target candidate capturing areas as the target capturing areas in response to the operation track having track points coincident with the at least two target candidate capturing areas.

In some exemplary embodiments, the screenshot processing apparatus 1700 may further include: a first area completing module configured to determine another candidate capturing area located within the target candidate capturing area as the target interception area. The another candidate capturing area has no point coincident with the operation track.

In some exemplary embodiments, the screenshot processing apparatus 1700 may further include: a second area completing module configured to determine another candidate capturing area as the target capturing area as well in response to another candidate capturing area overlapping the target candidate capturing area existing. The another candidate capturing area has no point coincident with the operation track.

In some exemplary embodiments, the screenshot processing apparatus 1700 may further include: a mode dividing module configured to divide the candidate capturing area into at least two capturing modes according to an image category of the candidate capturing area; an area screening module configured to provide the candidate capturing area corresponding to the target capturing mode in the current picture in response to the user's operation of selecting a target capturing mode from the at least two capturing modes.

In some exemplary embodiments, the area determining module 1720 may include: a second determining unit configured to determine the at least one target capturing area in the current picture according to the track shape corresponding to the operation track in response to the instruction of the second operation.

In some exemplary embodiments, the instruction of the second operation is the instruction of the screenshot operation of which an operation duration is greater than or equal to the duration threshold.

In some exemplary embodiments, the second determining unit may further include: a similarity acquisition subunit configured to obtain a similarity between the operation track and the track in a preset shape; a second determining subunit configured to generate the target capturing area in the current picture according to the track in a target shape corresponding to a target similarity in response to the target similarity being greater than or equal to the similarity threshold; the target capturing area contains the operation track.

In some exemplary embodiments, the image processing module 1730 may include: a first screenshot processing unit configured to perform the screenshot operation on the current picture according to at least one target capturing area, and generate a target image according to at least one obtained screenshot; a second screenshot processing unit configured to delete the at least one obtained screenshot, generate the target image according to the current picture having the at least one screenshot deleted.

In some exemplary embodiments, the image processing module 1730 may include: a contour separating subunit configured to separate the contour into sub-contours corresponding to different text styles in response to the category of the image content corresponding to the contour is text; a contour determining sub-unit configured to determine each separated sub-contour as an independent candidate capturing area.

The specific details of each module in the above device have been described in detail in the embodiments of the method. For undisclosed details, please refer to the embodiments of the method, so they will not be described again.

Those skilled in the art will understand that various aspects of the present disclosure may be implemented as systems, methods, or program products. Therefore, various aspects of the present disclosure may be embodied in the following forms: a complete hardware implementation, a complete software implementation (including firmware, microcode, etc.), or an implementation combining hardware and software, which may be collectively referred to herein as "circuit", "module" or "system".

Some exemplary embodiment of the present disclosure also provides an electronic device configured to implement the screenshot processing method, which may be the terminal device 101, terminal device 102, terminal device 103 or the server 105 in FIG. 1. The electronic device at least includes a processor and a memory, the memory is configured to store executable instructions of the processor, and the processor is configured to execute the screenshot processing method by executing the executable instructions.

Figure 18:
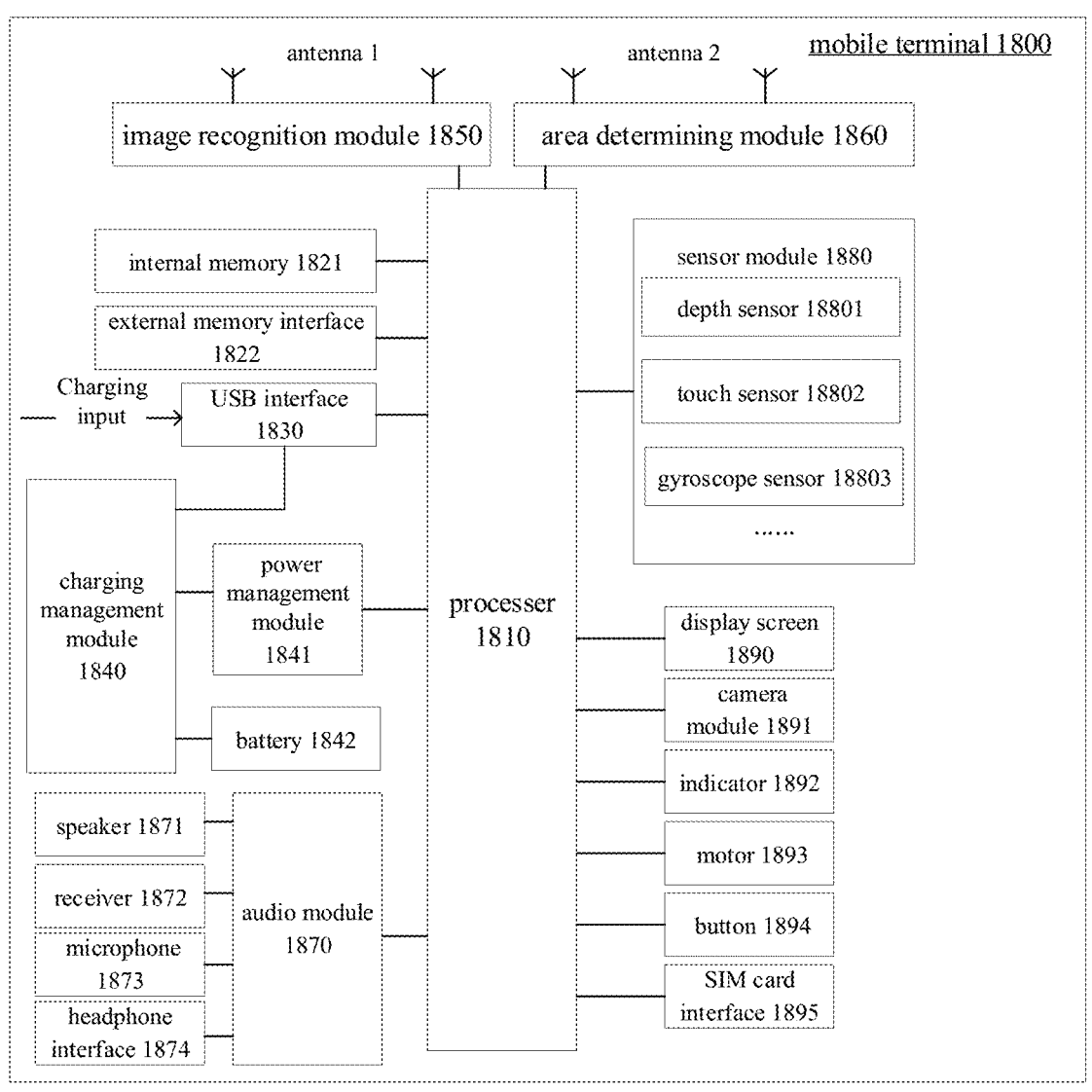
FIG. 18 shows a schematic diagram of an electronic device to which embodiments of the present disclosure can be applied.

The following takes the mobile terminal 1800 in FIG. 18 as an example to illustrate the structure of the electronic device in the embodiments of the present disclosure. It will be understood by those skilled in the art that, in addition to components specifically intended for mobile purposes, the structure in FIG. 18 can also be applied to stationary equipment. In other embodiments, the mobile terminal 1800 may include more or fewer components than shown, or some components may be combined, or some components may be separated, or may be arranged differently. The components illustrated may be implemented in hardware, software, or a combination of software and hardware. The interface connection relationship between the components is only schematically shown and does not constitute a structural limitation of the mobile terminal 1800. In other embodiments, the mobile terminal 1800 may also adopt an interface connection way different from that shown in FIG. 18, or a combination of multiple interface connection ways.

As shown in FIG. 18, the mobile terminal 1800 may specifically include: a processor 1810, an internal memory 1821, an external memory interface 1822, a universal serial bus (USB) interface 1830, a charging management module 1840, a power management module 1841, a battery 1842, an antenna 1, an antenna 2, a mobile communication module 1850, a wireless communication module 1860, an audio module 1870, a speaker 1871, a receiver 1872, a microphone 1873, a headphone interface 1874, a sensor module 1880, a display screen 1890, a camera module 1891, an indicator 1892, a motor 1893, a button 1894, and a subscriber identification module (SIM) card interface 1895, etc. The sensor module 1880 may include a depth sensor 18801, a touch sensor 18802, a gyroscope sensor 18803, etc.

The processor 1810 may include one or more processing units. For example, the processor 1810 may include an application processor (AP), a modem processor, a graphics processor (Graphics Processing Unit, GPU), an image signal processor (ISP), a controller, a video codec, a digital signal processor (DSP), a baseband processor and/or a neural network processor (Neural-Network Processing Unit, NPU), etc. Different processing units can be independent devices or integrated in one or more processors.

The NPU is a neural network (NN) computing processor, by drawing on the structure of biological neural networks, such as the transmission mode between human brain neurons, it can quickly process input information and can continuously learn by itself. The NPU can realize intelligent cognitive applications of the mobile terminal 1800, such as image recognition, face recognition, speech recognition, text understanding, etc.

The processor 1810 is provided with a memory. The memory can store instructions for implementing six modular functions: detection instructions, connection instructions, information management instructions, analysis instructions, data transmission instructions, and notification instructions, and the instructions are controlled and executed by the processor 1810.

The charging management module 1840 is configured to receive charging input from the charger. The power management module 1841 is configured to connect the battery 1842, the charging management module 1840 and the processor 1810. The power management module 1841 receives input from the battery 1842 and/or the charging management module 1840 and supplies power to the processor 1810, the internal memory 1821, the display screen 1890, the camera module 1891, and the wireless communication module 1860, etc.

The wireless communication function of the mobile terminal 1800 can be implemented through the antenna 1, the antenna 2, the mobile communication module 1850, the wireless communication module 1860, the modem processor, and baseband processor, etc. The antenna 1 and the antenna 2 are configured to transmit and receive electromagnetic wave signals; the mobile communication module 1850 can provide solutions for wireless communications including 2G/3G/4G/5G applied to the mobile terminal 1800; the modem processor may include a modulator and a demodulator; the wireless communication module 1860 can provide wireless local area networks (WLAN) (such as wireless fidelity (Wi-Fi) network), Bluetooth (BT) and other wireless communication solutions applied to the mobile terminal 1800. In some embodiments, the antenna 1 of the mobile terminal 1800 is coupled to the mobile communication module 1850, and the antenna 2 is coupled to the wireless communication module 1860, so that the mobile terminal 1800 can communicate with the network and other devices through wireless communication technology.

The mobile terminal 1800 implements the display function through the GPU, the display screen 1890 and the AP. The GPU is a microprocessor for image processing and is connected to the display screen 1890 and the AP. The GPU is configured to perform mathematical and geometric calculations and for graphics rendering. The processor 1810 may include one or more GPUs that execute program instructions to generate or alter display information.

The mobile terminal 1800 can realize the shooting function through the ISP, the camera module 1891, the video codec, the GPU, the display screen 1890 and the AP. The ISP is configured to process the data fed back by the camera module 1891; the camera module 1891 is configured to capture static images or videos; the DSP is configured to process digital signals, in addition to processing digital image signals, the DSP can also process other digital signals; the video codec is configured to compress or decompress digital videos, and the mobile terminal 1800 may also support one or more video codecs.

The external memory interface 1822 may be configured to connect an external memory card, such as a Micro SD card, to increase the storage capacity of the mobile terminal 1800. The external memory card communicates with the processor 1810 through the external memory interface 1822 to implement the data storage function, such as saving files like music, videos, etc., in the external memory card.

The internal memory 1821 may be configured to store computer executable program code, the computer executable program code includes instructions. The internal memory 1821 may include a program storage area and a data storage area. The program storage area can store an operating system, and an application program required for at least one function (such as a sound playback function, an image playback function, etc.). The data storage area can store data created during use of the mobile terminal 1800 (such as audio data, phone book, etc.). In addition, the internal memory 1821 may include a high-speed random access memory, and may also include a non-volatile memory, such as at least one disk storage device, flash memory device, Universal Flash Storage (UFS), etc. The processor 1810 executes various functional applications and data processing of the mobile terminal 1800 by executing instructions stored in the internal memory 1821 and/or instructions stored in a memory provided in the processor.

The mobile terminal 1800 can implement audio functions such as music playback, recording, etc., through the audio module 1870, the speaker 1871, the receiver 1872, the microphone 1873, the headphone interface 1874, and the AP, etc.

The depth sensor 18801 is configured to obtain depth information of a scene. In some embodiments, the depth sensor 18801 may be provided in the camera module 1891.

The touch sensor 18802 is configured to sense touch signals and can convert the touch signals into electrical signals. In some embodiments, the touch sensor 18802 may be disposed on the display screen 1890. There are many types of touch sensors 18802, such as resistive touch sensors, inductive touch sensors, capacitive touch sensors, etc.

The gyro sensor 18803 may be configured to determine a motion gesture of the mobile terminal 1800. In some embodiments, angular velocity of the mobile terminal 1800 about three axes (ie, x, y, and z axes) may be determined by the gyro sensor 18803. The gyro sensor 18803 can be configured for scenes such as anti-shake when shooting, navigation, motion sensing games, etc.

In addition, sensors with other functions can also be set in the sensor module 1880 according to actual needs, such as an air pressure sensor, a magnetic sensor, an acceleration sensor, a distance sensor, a proximity light sensor, a fingerprint sensor, a temperature sensor, an ambient light sensor, a bone conduction sensor, etc.

The mobile terminal 1800 may further include other devices that provide auxiliary functions. For example, the key 1894 include a power key, a volume key, etc. The user can generate key signal inputs related to user settings and function control of the mobile terminal 1800 through the keys. For another example, the indicator 1892, the motor 1893, the SIM card interface 1895, etc.

In addition, exemplary embodiments of the present disclosure further provide a computer-readable storage medium on which a program product capable of implementing the method described above is stored. In some embodiments, various aspects of the present disclosure may also be implemented in the form of a program product, the program product includes program code. When the program product is run on a terminal device, the program code is configured to cause the terminal device to execute the operations according to various exemplary embodiments of the present disclosure described above.

It should be noted that the computer-readable medium shown in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. More specific examples of computer readable storage media may include, but are not limited to: an electrical connection having one or more wires, a portable computer disk, a hard drive, a Random Access Memory (RAM), a Read Only Memory (ROM), an Erasable Programmed Read-only Memory (EPROM or flash memory), fiber optics, portable compact disk read-only memory (CD-ROM), optical storage device, magnetic storage device, or any suitable combination of the above.

In the present disclosure, the computer-readable storage medium may be any tangible medium that contains or stores a program for use by or use in combination with an instruction execution system, apparatus, or device. In the present disclosure, a computer-readable signal medium may include a data signal propagated in baseband or as part of a carrier wave, carrying computer-readable program code therein. Such propagated data signals may take many forms, including but not limited to electromagnetic signals, optical signals, or any suitable combination of the above. The computer-readable signal medium may also be any computer-readable medium other than the computer-readable storage medium that can send, propagate, or transmit the program for use by or use in combination with the instruction execution system, apparatus, or device. Program code embodied on the computer-readable medium may be transmitted using any suitable medium, including but not limited to: wireless, wire, optical cable, RF, etc., or any suitable combination of the foregoing.

Furthermore, program code configured to perform the operations of the present disclosure may be written in any combination of one or more programming languages, including object-oriented programming languages-such as Java, C++, etc., as well as conventional procedural programming language-such as "C" or a similar programming language. The program code may execute entirely on the user's computing device, partly on the user's device, as a standalone software package, partly on the user's computing device and partly on a remote computing device, or entirely on the remote computing device or server. In situations involving the remote computing device, the remote computing device may be connected to the user computing device through any kind of network, including a local area network (LAN) or a wide area network (WAN), or may be connected to an external computing device (such as connecting via the Internet provided by an Internet service provider).

Other embodiments of the disclosure will be apparent to those skilled in the art since considering the description and practice of the embodiments disclosed herein. This disclosure is intended to cover any variations, uses, or adaptations of the disclosure that follow the general principles of the disclosure and include common knowledge or normal technical means in the technical field that are not disclosed in the disclosure. It is intended that the description and embodiments are considered as exemplary only, with a true scope and spirit of the disclosure being indicated by the following claims.

It is to be understood that the present disclosure is not limited to the precise structures described above and illustrated in the accompanying drawings, and various modifications and changes may be made without departing from the scope thereof. The scope of the present disclosure is limited only by the appended claims.

What is claimed is:

1. A screenshot processing method, comprising:

determining a candidate capturing area according to an obtained contour recognition result by performing contour recognition on a current picture;

in response to an instruction of a screenshot operation, determining at least one target capturing area in the current picture according to the instruction of the screenshot operation and the candidate capturing area; and performing the screenshot operation in the current picture based on the at least one target capturing area;

wherein before the in response to an instruction of a screenshot operation, determining at least one target capturing area in the current picture according to the instruction of the screenshot operation and the candidate capturing area, the method further comprises:

dividing the candidate capturing areas into at least two capturing modes corresponding to different image categories;

providing a candidate capturing area corresponding to the target capturing mode in the current picture in response to the user selecting the target capturing mode from the at least two capturing modes.

2. The method according to claim 1, wherein the in response to an instruction of the screenshot operation, determining at least one target capturing area in the current picture according to the instruction of the screenshot operation and the candidate capturing area, comprises:

in response to an instruction of a first operation, determining the at least one target capturing area in the candidate capturing area according to the instruction of the first operation and the candidate capturing area.

3. The method according to claim 2, wherein the instruction of the first operation is the instruction of the screenshot operation of which an operation duration is less than a duration threshold.

4. The method according to claim 2, wherein the in response to an instruction of a screenshot operation, determining at least one target capturing area in the current picture according to the instruction of the screenshot operation and the candidate capturing area, comprises:

obtaining coincident track points between an operation track and the candidate capturing area; and in response to a target candidate capturing area existing, determining the target candidate capturing area as the target capturing area, wherein the proportion of the number of the coincident track points corresponding to the target candidate capturing area to the total number of the operation track points is greater than a proportion threshold.

5. The method according to claim 2, wherein the in response to an instruction of a first operation, determining the at least one target capturing area in the candidate capturing area according to the instruction of the first operation and the candidate capturing area comprises:

in response to coincident track points between an operation track and at least two target candidate capturing areas existing, determining the at least two target candidate capturing areas as the target capturing areas.

6. The method according to claim 4, wherein the method further comprises:

determining another candidate capturing area located within the target candidate capturing area as the target capturing area as well;

wherein no coincident point between the another candidate capturing area and the operation track exists.

7. The method according to claim 4, wherein the method further comprises:

in response to another candidate capturing area overlapping the target candidate capturing area existing, determining the another candidate capturing area as the target capturing area as well;

wherein no coincident point between the another candidate capturing area and the operation track exists.

8. The method according to claim 1, wherein the in response to an instruction of a screenshot operation, determining at least one target capturing area in the current picture according to the instruction of the screenshot operation and the candidate capturing area comprises:

in response to an instruction of a second operation, determining at least one target capturing area in the current picture according to a track shape corresponding to an operation track.

9. The method according to claim 8, wherein the instruction of the second operation is the instruction of the screenshot operation of which an operation duration is greater than or equal to a duration threshold.

10. The method according to claim 8, wherein the in response to an instruction of a second operation, determining at least one target capturing area in the current picture according to a track shape corresponding to an operation track comprises:

obtaining a target similarity between the track shape of the operation track and a preset track shape;

generating the target capturing area in the current picture according to a target track shape corresponding to the target similarity in response to the target similarity being greater than or equal to a similarity threshold;

wherein, the target capturing area contains the operation track.

11. The method according to claim 1, wherein the performing the screenshot operation in the current picture based on the at least one target capturing area comprises:

performing the screenshot operation in the current picture based on the at least one target capturing area, and generate a target image based on obtained at least one screenshot; or deleting the obtained at least one screenshot, and generating the target image according to the current picture having the at least one screenshot deleted.

12. The method according to claim 1, wherein the performing contour recognition on the current picture to determine a candidate capturing area according to an obtained contour recognition result comprises:

separating the contour into sub-contours corresponding to different text styles in response to a category of image content corresponding to the contour of the contour recognition result being text;

determining each separated sub-contour as an independent candidate capturing area.

13. An electronic device, comprising:

a processor; and a memory, configured to store executable instructions for the processor;

wherein, by executing the executable instructions, the processor is configured to:

determine a candidate capturing area according to an obtained contour recognition result by performing contour recognition on a current picture;

in response to an instruction of a screenshot operation, determine at least one target capturing area in the current picture according to the instruction of the screenshot operation and the candidate capturing area; and perform the screenshot operation in the current picture based on the at least one target capturing area;

wherein before the in response to an instruction of a screenshot operation, determining at least one target capturing area in the current picture according to the instruction of the screenshot operation and the candidate capturing area, the processor is further configured to:

divide the candidate capturing areas into at least two capturing modes corresponding to different image categories;

provide a candidate capturing area corresponding to the target capturing mode in the current picture in response to the user selecting the target capturing mode from the at least two capturing modes.

14. The electronic device according to claim 13, wherein the in response to an instruction of the screenshot operation, determining at least one target capturing area in the current picture according to the instruction of the screenshot operation and the candidate capturing area, comprises:

in response to an instruction of a first operation, determining the at least one target capturing area in the candidate capturing area according to the instruction of a first operation and the candidate capturing area.

15. The electronic device according to claim 14, wherein the instruction of the first operation is the instruction of the screenshot operation of which an operation duration is less than a duration threshold.

16. The electronic device according to claim 14, wherein the in response to an instruction of a screenshot operation, determining at least one target capturing area in the current picture according to the instruction of the screenshot operation and the candidate capturing area, comprises:

obtaining coincident track points between an operation track and the candidate capturing area;

in response to a target candidate capturing area existing, determining the target candidate capturing area as the target capturing area, wherein the proportion of the number of the coincident track points corresponding to the target candidate capturing area to the total number of the operation track points is greater than a proportion threshold.

17. The electronic device according to claim 14, wherein the in response to an instruction of a first operation, determining the at least one target capturing area in the candidate capturing area according to the instruction of the first operation and the candidate capturing area comprises:

in response to coincident track points between an operation track and at least two target candidate capturing areas existing, determining the at least two target candidate capturing areas as the target capturing areas.

18. The electronic device according to claim 16, wherein the processor is further configured to:

determine another candidate capturing area located within the target candidate capturing area as the target capturing area as well;

wherein no coincident point between the another candidate capturing area and the operation track exists.

19. A non-transitory computer-readable storage medium having a computer program stored thereon, the computer program implements a screenshot processing method when executed by a processor, the screenshot processing method comprises:

determining a candidate capturing area according to an obtained contour recognition result by performing contour recognition on a current picture;

in response to an instruction of a screenshot operation, determining at least one target capturing area in the current picture according to the instruction of the screenshot operation and the candidate capturing area; and performing the screenshot operation in the current picture based on the at least one target capturing area;

wherein before the in response to an instruction of a screenshot operation, determining at least one target capturing area in the current picture according to the instruction of the screenshot operation and the candidate capturing area, the method further comprises:

dividing the candidate capturing areas into at least two capturing modes corresponding to different image categories;

providing a candidate capturing area corresponding to the target capturing mode in the current picture in response to the user selecting the target capturing mode from the at least two capturing modes.

\* \* \* \* \*